United States Patent [19]

Brandenstein et al.

[11] Patent Number: 4,576,268
[45] Date of Patent: Mar. 18, 1986

[54] SLIDING SLEEVE FOR CLUTCH SHIFTERS

[75] Inventors: Manfred Brandenstein, Eussenheim; Lothar Walter, Schweinfurt; Roland Haas, Lendershausen; Herbert Dobhan, Bergrheinfeld, all of Fed. Rep. of Germany

[73] Assignee: SKF Kugellagerfabriken GmbH, Schweinfurt, Fed. Rep. of Germany

[21] Appl. No.: 446,399

[22] Filed: Dec. 2, 1982

[30] Foreign Application Priority Data

Dec. 21, 1981 [DE] Fed. Rep. of Germany ... 8137226[U]

[51] Int. Cl.⁴ ............................................. F16D 23/14
[52] U.S. Cl. .................................... 192/98; 192/110 B
[58] Field of Search ............................. 192/98, 110 B; 308/184 A, 184 R, 233; 384/420

[56] References Cited

U.S. PATENT DOCUMENTS

| | | | |
|---|---|---|---|
| 3,904,008 | 9/1975 | Sonnerat | 192/98 |
| 4,117,916 | 10/1978 | Baker | 192/98 |
| 4,327,823 | 5/1982 | Müller et al. | 192/98 |
| 4,351,427 | 9/1982 | Miyahara | 192/110 B X |
| 4,403,685 | 9/1983 | Beccaris | 192/110 R X |

FOREIGN PATENT DOCUMENTS

| | | | |
|---|---|---|---|
| 0030165 | 6/1981 | European Pat. Off. | 192/98 |
| 2830249 | 1/1979 | Fed. Rep. of Germany | 192/98 |
| 2389799 | 1/1979 | France | 192/98 |
| 2045381 | 10/1980 | United Kingdom | 192/98 |
| 2072789 | 10/1981 | United Kingdom | 192/98 |
| 2073353 | 10/1981 | United Kingdom | 192/98 |

Primary Examiner—Rodney H. Bonck
Attorney, Agent, or Firm—Eugene E. Renz, Jr.

[57] ABSTRACT

A sliding sleeve for a clutch shifter particularly for automobile clutches comprising an elongated hub body made of a plastic material, a thrust collar which protrudes radially outwardly from the hub body and includes contact surfaces for the shift lever of the clutch and for the shift bearing, at least two lugs secured in the hub body and directed radially inwardly adjacent the bore of the thrust collar, each lug being of generally U-shaped cross section to define a groove for the shift lever extending in an axial direction and a thin plastic layer overlying the side surfaces of the groove receiving the projections of the shift lever in the hub body and the adjacent surfaces of the ends of the lugs directed radially outwardly and running parallel to the contact surfaces.

3 Claims, 4 Drawing Figures

SLIDING SLEEVE FOR CLUTCH SHIFTERS

SUMMARY OF THE INVENTION

The present invention relates to a sliding sleeve particularly adapted for automobile clutch assemblies comprising a hub body and a thrust collar protruding outwardly from the hub body and including contact surfaces for the shift lever of the clutch and clutch shifter bearing.

Sliding sleeves are already known which consist of a plastic part and a metal insert wherein the shift lever for the clutch fits axially against the metal insert and is secured by a locking element which is formed as part of the plastic member in these sliding sleeves. There is the disadvantage in these prior sleeve assemblies that the shift lever engages in a peripheral direction against the plastic part of the sliding sleeve so that the shift lever very quickly wears out the relatively soft plastic.

With the foregoing in mind, it is an object of the present invention to provide a sliding sleeve of the above mentioned type which can be manufactured relatively easily and economically, is comparatively light-weight and is characterized by contact surfaces for the shift lever which do not change shape and function to dampen vibrations and noise. To this end, the sleeve includes a thrust collar engaging in the hub body which has at least two lugs of U-shaped cross section which are directed radially inwardly and fastened in the hub body in the vicinity of the bore thereof. The free terminal end portions of these lugs are bent in an axial direction towards the shift lever and are provided at their edges with end portions which are directed radially outwardly forming a groove and include a thin plastic layer between the side surfaces of the groove for receiving the projections of the shift lever in the hub body. The surfaces of the ends of the lugs directed radially outwardly run adjacent to and parallel to the contact surface of the grooves. By reason of the metal reinforcement construction a high torque resistance of the sliding sleeve is obtained in the vicinity of the grooves of the shift lever as well as good noise and vibration damping. Additionally, a wear resistant contact surface is provided for the shift lever.

In accordance with another feature of the sliding sleeve of the present invention, a pair of spaced confronting spring tabs are provided at the open end of the groove in the hub body which ensure a slight embracing of the shift lever and fix the clutch shifter to the shift lever.

The hub body of the sliding sleeve of the present invention is also provided on the side of the thrust collar facing the clutch with projections or the like which are directed radially outwardly and by reason of this the thrust collar is also fixed in an axial direction.

BRIEF DESCRIPTION OF THE DRAWINGS

These and other objects of the present invention and the various features and details of the operation in construction thereof, are hereinafter more fully set forth with reference to the accompanying drawings, wherein.

DESCRIPTION OF THE PREFERRED EMBODIMENTS

Figure 1:
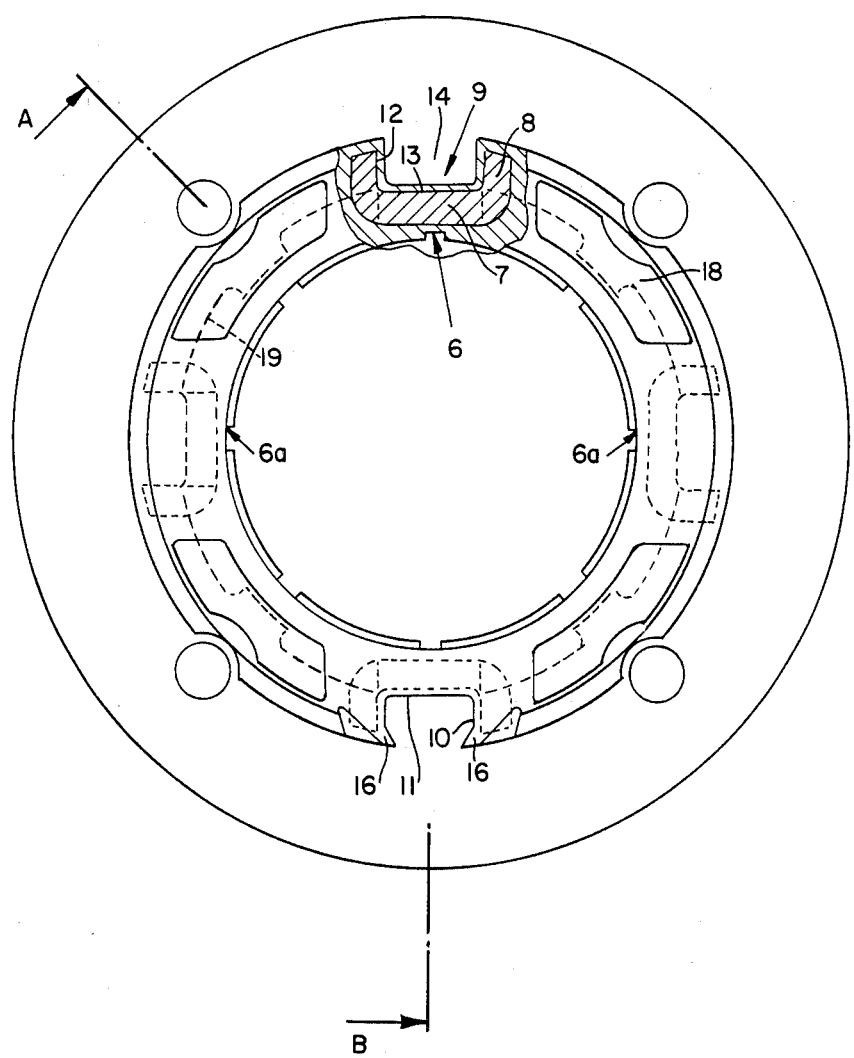
FIG. 1 is an end elevational view of a sliding sleeve for a clutch assembly constructed in accordance with the present invention.
Figure 3:
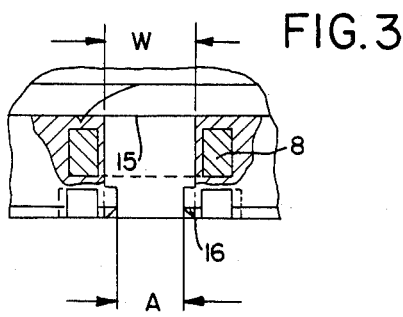
FIG. 3 is a fragmentary view partly in section showing the groove of the sliding sleeve for receiving the shift lever.
Figure 2:
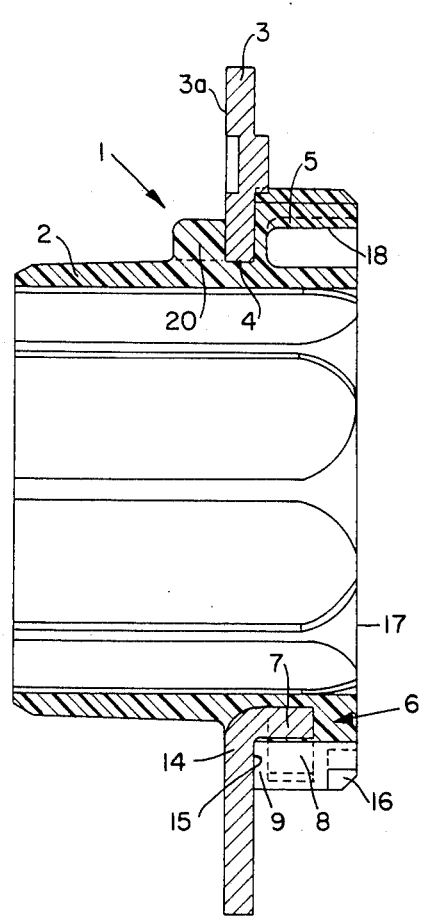
FIG. 2 is a cross sectional view taken along the lines A–B of FIG. 1.
Figure 4:
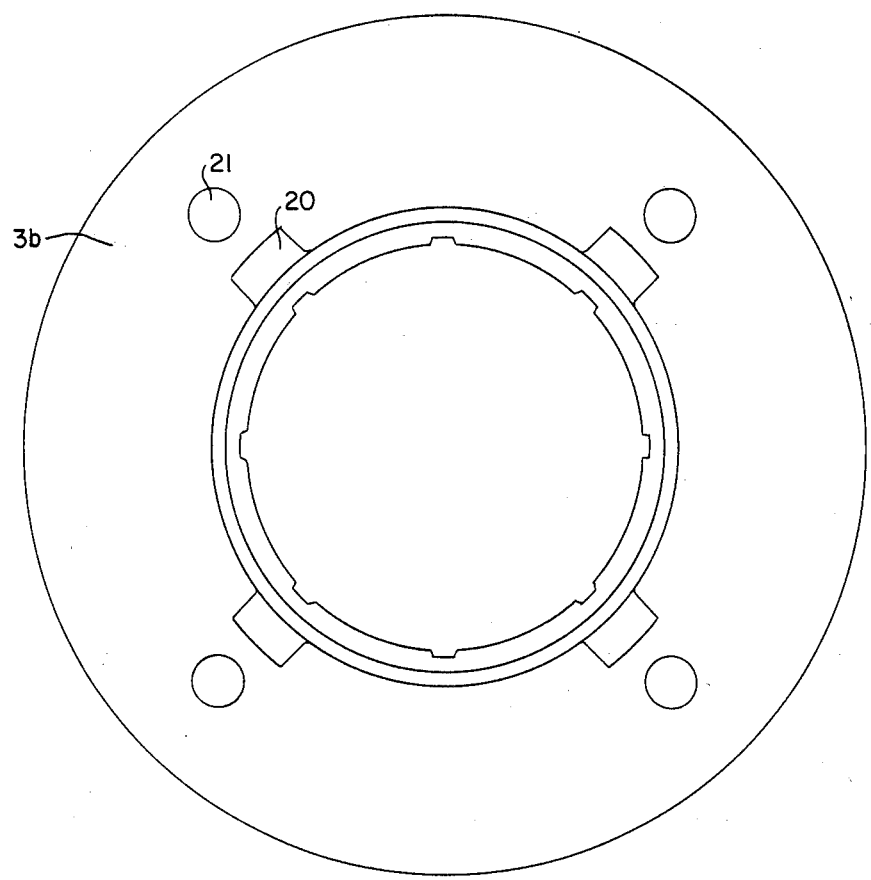
FIG. 4 is an end elevational view of the sliding sleeve of the present invention as viewed from an end opposite to that of FIG. 1.

Referring now to the drawings, there is illustrated a sliding sleeve generally designated by the numeral 1 for a clutch shifter bearing. The sliding sleeve 1 comprises an elongated hub body 2 made of a resilient material, such as plastic, and a metal thrust collar 3 secured adjacent the bore 4 of the thrust collar 3 in a section 5 of the hub body 2 which is of a larger diameter. To this end, the thrust collar 3 is provided in the present instance with four circumferentially equispaced lugs 6 formed integrally with the thrust collar 3 adjacent the bore 4 thereof. Each of the lugs 6 as illustrated is of generally U-shaped cross section which extend towards the shift lever in an axial direction. Each lug comprises an angled or base section 7 having radially outwardly directed leg sections 8 at opposite sides of the base section 7. As illustrated in FIG. 1, the base section 7 of two diametrically opposed lugs 6 run parallel to each other and tangential to the bore of the sliding sleeve 1 so that the base sections of the two diametrically opposed lugs 6 serve to reinforce the hub body 2 in the zone of longitudinally extending grooves 9 formed by the lugs 6 within which the shift lever engages. The lugs 6 are formed in the body section so that a thin plastic layer lies between the contact surfaces 10, 11 for the shift lever which engages in the grooves 9 and the adjacent surfaces 12, 13 of the lug. The radial section 14 of the thrust collar 3 at the end of the groove or channel 9 does not have a plastic covering and in this fashion serves as a wear resistant contact surface 15 for the shift lever in an axial direction.

At the open end of the grooves 9, that is, at the axial end thereof opposite the contact surface 15, the plastic layer surrounding the section 9 is formed with a pair of confronting spring tabs 16 forming an integral part of the hub body and having a minimum spacing A between the confronting tips thereof which is less than the width W of the groove 9 so that the spring tabs deflect outwardly when actuating the shift lever and the projections of the shift lever can be urged into the grooves 9.

As illustrated in FIG. 1, four lugs 6 are provided which are circumferentially equispaced in the hub body. Two of the lugs 6 are used for reinforcing the hub body 2 in the zone of the grooves 9 to receive the shift lever and the other two lugs 6a prevent formation of sink marks at the surface of section 5 during casting of the hub body 2. Additionally, the hub body 2 is provided with axially extending recesses 18 between the grooves 9 as viewed from the front of the hub body facing away from the clutch for a better connection with the thrust collar 3 which engages in recesses 19 in its bore. The thrust collar 3 is additionally fixed in an axial position on the hub body by a series of circumferentially spaced radially outwardly directed projections 20 formed integrally with the hub body and which confront and engage the face 3a of the thrust collar facing the clutch. The pressure plate 3b of the thrust collar has four circumferentially equispaced openings or recesses 21 at the periphery to receive correspondingly complementary projections of the stationary bearing ring of the clutch shifter bearing (not shown) to lock it against rotation.

While a particular embodiment of the present invention has been illustrated and described herein, it is not intended to limit the invention in changes and modifications may be made therein within the scope of the following claims.

What is claimed is:

1. A sliding sleeve for a clutch shifter particularly for automotive clutches comprising an elongated generally tubular hub body made of a plastic material, an annular metallic thrust collar projecting radially outwardly from the hub body and connected thereto by connecting means, said connecting means including at least two lugs projecting axially from one radial face of said thrust collar, each lug being of generally U-shaped cross section consisting of a base section and generally radially directed upstanding leg portions, said leg portions spaced axially from said radial face of the thrust collar to provide a web of plastic material therebetween, said lug defining a groove for the shift lever extending in an axial direction, a thin plastic layer overlying the base and upstanding leg portions of each of said lugs and said radial face of the thrust collar at the inner axial end of the groove being uncoated and presenting a direct metallic contact surface for the shift lever.

2. A sliding sleeve as claimed in claim 1 wherein the thin plastic layer covering the upstanding leg portions of said lugs is formed to define a pair of confronting spring tabs at the open end of said groove having a predetermined spacing between the confronting terminal tips of said spring tabs which is less than the width of the groove.

3. A sliding sleeve as claimed in claim 1 wherein said hub body includes projections directed radially outwardly on the face of the thrust collar opposite said uncoated radial face thereof.

* * * * *